US006417152B1

(12) United States Patent
Kottwitz et al.

(10) Patent No.: US 6,417,152 B1
(45) Date of Patent: Jul. 9, 2002

(54) DETERGENT CONTAINING GLUCANASE

(75) Inventors: Beatrix Kottwitz, Duesseldorf; Karl-Heinz Maurer, Erkrath, both of (DE)

(73) Assignee: Henkel Kommanditgesellshaft auf Aktien, Duesseldorf (DE)

( * ) Notice: Subject to any disclaimer, the term of this patent is extended or adjusted under 35 U.S.C. 154(b) by 0 days.

(21) Appl. No.: 09/463,861

(22) PCT Filed: Jul. 21, 1998

(86) PCT No.: PCT/EP98/04578

§ 371 (c)(1), (2), (4) Date: Apr. 4, 2000

(87) PCT Pub. No.: WO99/06516

PCT Pub. Date: Feb. 11, 1999

(30) Foreign Application Priority Data

Jul. 30, 1997 (DE) ........................................ 197 32 749

(51) Int. Cl.$^{7}$ ............................ C11D 3/00; C11D 7/42; C11D 3/386; C12S 9/00

(52) U.S. Cl. ...................... 510/392; 510/320; 435/200; 435/209

(58) Field of Search ................................ 510/392, 320; 435/209, 200

(56) References Cited

U.S. PATENT DOCUMENTS

| | | | | |
|---|---|---|---|---|
| 4,585,642 A | | 4/1986 | Rieck | 423/333 |
| 4,664,839 A | | 5/1987 | Rieck | 252/175 |
| 4,820,439 A | | 4/1989 | Rieck | 252/135 |
| 4,966,996 A | | 10/1990 | Schaefer et al. | 562/598 |
| 4,985,553 A | | 1/1991 | Fuertes et al. | 536/124 |
| 5,183,651 A | | 2/1993 | Schimmel et al. | 423/334 |
| 5,229,095 A | | 7/1993 | Schimmel et al. | 423/334 |
| 5,268,156 A | | 12/1993 | Schimmel et al. | 423/334 |
| 5,308,596 A | | 5/1994 | Kotzian et al. | 423/333 |
| 5,318,733 A | | 6/1994 | Carduck et al. | 264/15 |
| 5,382,377 A | | 1/1995 | Raehse et al. | 252/174 |
| 5,417,951 A | | 5/1995 | Just | 423/334 |
| 5,494,488 A | | 2/1996 | Arnoldi et al. | 8/137 |
| 5,541,316 A | | 7/1996 | Engelskirchen et al. | 510/471 |
| 5,580,941 A | | 12/1996 | Krause et al. | 527/300 |
| 5,616,550 A | | 4/1997 | Kruse et al. | 510/444 |
| 5,691,295 A | * | 11/1997 | Maurer et al. | 510/392 |
| 5,783,616 A | | 7/1998 | Krause et al. | 524/58 |
| 5,798,328 A | | 8/1998 | Kottwitz et al. | 510/438 |
| 5,811,381 A | * | 9/1998 | Emalfarb et al. | 510/320 |
| 5,830,956 A | | 11/1998 | Stockhauser et al. | 526/318.2 |
| 5,847,065 A | | 12/1998 | Krause et al. | 527/300 |
| 5,854,191 A | | 12/1998 | Krause et al. | 510/276 |
| 5,854,321 A | | 12/1998 | Krause et al. | 524/58 |
| 5,856,451 A | | 1/1999 | Olsen et al. | 530/402 |
| 5,990,065 A | | 11/1999 | Vinson et al. | 510/237 |

FOREIGN PATENT DOCUMENTS

| | | |
|---|---|---|
| CA | 1 036 455 | 8/1978 |
| DE | 24 12 837 | 10/1974 |
| DE | 226 012 | 8/1985 |
| DE | 39 21 839 | 1/1991 |
| DE | 42 21 381 | 2/1994 |
| DE | 43 00 772 | 7/1994 |
| DE | 43 03 320 | 11/1995 |
| DE | 44 16 438 | 11/1995 |
| DE | 44 17 734 | 11/1995 |
| DE | 196 16 770 | 1/1996 |
| DE | 44 43 177 | 6/1996 |
| DE | 195 29 905 | 2/1997 |
| DE | 195 36 082 | 4/1997 |
| DE | 196 05 688 | 8/1997 |
| DE | 196 13 103 | 10/1997 |
| DE | 196 20 411 | 10/1997 |
| DE | 196 16 693 | 11/1997 |
| DE | 196 16 767 | 11/1997 |
| DE | 196 16 769 | 11/1997 |
| DE | 196 19 221 | 11/1997 |
| DE | 196 20 267 | 11/1997 |
| DE | 197 32 751 | 2/1999 |
| EP | 0 164 514 | 12/1985 |
| EP | 0 164 552 | 12/1985 |
| EP | 0 232 202 | 8/1987 |
| EP | 0 272 030 | 6/1988 |
| EP | 0 293 753 | 12/1988 |
| EP | 0 392 592 | 10/1990 |
| EP | 0 425 427 | 5/1991 |
| EP | 0 436 835 | 7/1991 |
| EP | 0 443 651 | 8/1991 |
| EP | 0 446 982 | 9/1991 |
| EP | 0 453 003 | 10/1991 |
| EP | 0 458 397 | 11/1991 |
| EP | 0 458 398 | 11/1991 |
| EP | 0 486 592 | 5/1992 |
| EP | 0 502 325 | 9/1992 |
| EP | 0 525 239 | 2/1993 |

(List continued on next page.)

OTHER PUBLICATIONS

Industrielle Enzyme Chapter 11.5 (1994) pp. 728–757.

Anal.Biochem 47 (1972) pp. 273–279.

Anal. Biochem 81 (1977) pp. 21–27.

Tenside 7 (1970) p. 125.

Applied & Environmental Microbiol. (1994), pp. 1213–1220.

Appl. Microbiol. Biotech 38 (1993), pp. 507–513.

Biochemica et Biophysica Acta, 384 (1975), pp. 477–483.

Appl. Microbiol Biotech 39 (1993), pp. 507–513.

Gene 29 (1984), pp. 21–26.

Industrial Enzymes and Their Applications, Uhlig, Wiley 1998, pp. 96–101, 114–119.

*Primary Examiner*—Lorna M. Douyon
*Assistant Examiner*—Eisa Elhilo
(74) *Attorney, Agent, or Firm*—Stephen D. Harper; Glenn E. J. Murphy

(57) ABSTRACT

A detergent composition comprising a β-glucanase is presented. The β-glucanase improves the cleaning performance of the detergent, especially with respect to polysaccharide soils.

11 Claims, No Drawings

FOREIGN PATENT DOCUMENTS

| | | | | |
|---|---|---|---|---|
| EP | 0 544 490 | | 6/1993 | |
| EP | 0 548 599 | | 6/1993 | |
| EP | 0 549 271 | | 6/1993 | |
| EP | 0 549 272 | | 6/1993 | |
| EP | 0 564 476 | | 10/1993 | |
| EP | 0 642 576 | | 3/1995 | |
| EP | 0 693 550 | | 1/1996 | |
| EP | 0 709 452 | | 5/1996 | |
| EP | 0 747 470 | | 12/1996 | |
| EP | 0 755 999 | | 1/1997 | |
| EP | 0 756 000 | | 1/1997 | |
| EP | 0 544 519 | | 6/1997 | |
| GB | 2 283 982 | | 5/1995 | |
| JP | 04/238809 | | 8/1992 | |
| JP | 04/260610 | | 9/1992 | |
| WO | WO91/02781 | | 3/1991 | |
| WO | WO91/02792 | | 3/1991 | |
| WO | WO91/08171 | | 6/1991 | |
| WO | WO92/06184 | | 4/1992 | |
| WO | WO92/18542 | | 10/1992 | |
| WO | WO92/21760 | | 12/1992 | |
| WO | WO93/16110 | | 8/1993 | |
| WO | WO94/02597 | | 2/1994 | |
| WO | WO94/02618 | | 2/1994 | |
| WO | WO94/05762 | | 3/1994 | |
| WO | WO94/18314 | | 8/1994 | |
| WO | WO94/23005 | | 10/1994 | |
| WO | WO94/23053 | | 10/1994 | |
| WO | WO94/27970 | | 12/1994 | |
| WO | WO94/28102 | | 12/1994 | |
| WO | WO94/28103 | | 12/1994 | |
| WO | WO95/00626 | | 1/1995 | |
| WO | WO95/07350 | | 3/1995 | |
| WO | WO95/14075 | | 5/1995 | |
| WO | WO95/27775 | | 5/1995 | |
| WO | WO95/14759 | | 6/1995 | |
| WO | WO95/17498 | | 6/1995 | |
| WO | WO95/22592 | | 8/1995 | |
| WO | WO95/23221 | | 8/1995 | |
| WO | WO 95/35362 | * | 12/1995 | .................... 3/386 |
| WO | WO95/35362 | | 12/1995 | |
| WO | WO96/16153 | | 5/1996 | |
| WO | WO96/23579 | | 8/1996 | |
| WO | WO96/23859 | | 8/1996 | |
| WO | WO96/23860 | | 8/1996 | |
| WO | WO96/23861 | | 8/1996 | |
| WO | WO96/34108 | | 10/1996 | |
| WO | WO97/12021 | | 4/1997 | |
| WO | WO97/13862 | | 4/1997 | |

* cited by examiner

DETERGENT CONTAINING GLUCANASE

This application is filed under 35 U.S.C. 371 and based on PCT/EP98/04578, filed Jul. 21, 1998.

BACKGROUND OF THE INVENTION

1. Field of the Invention

This invention relates to laundry detergents which contain β-glucanase to improve their cleaning performance.

2. Discussion of Related Art

Enzymes, especially proteases, lipases and cellulases, but also amylases, are widely used in laundry detergents, washing aids and dishwashing detergents. Proteases, lipases or amylases are primarily used to remove protein, fatty and starch soils. By contrast, cellulases occupy a special position because they are not used to remove special soils, but instead have been known for some time as softening agents for cotton fabrics by virtue of their ability to degrade cellulose. A side effect of the degradation of cellulose fibrils by cellulases is the deepening of the optical color impression, the so-called color freshening effect, which is obtained in the treatment of colored cotton fabrics with cellulases when the undyed fibrils resulting from fiber damage from within the fibers are removed.

In connection with polysaccharide soils, there is the problem that naturally occurring polysaccharides, for example as present in foods, do not normally consist solely of starch, but also contain other saccharides or differently linked saccharides. Whereas α-amylases intended for use in laundry detergents are generally very suitable for hydrolyzing the starch component of polysaccharide soils into water-soluble oligosaccharides, their soil removal capacity can be unsatisfactory when the soils in question are soils of other polysaccharides or when these other polysaccharides make up relatively large parts of the polysaccharide soils.

The problem addressed by the present invention was to remedy this situation and to provide a detergent which would have an improved cleaning performance with respect to polysaccharide soils.

DESCRIPTION OF THE INVENTION

The present invention, which is intended to solve the problem stated above, relates to a detergent suitable for use in the washing of laundry which contains a β-glucanase in addition to typical ingredients compatible with this enzyme.

β-Glucanases in the context of the present invention are enzymes from the class of endo-1,3-1,4-β-D-glucan-4-glucanohydrolases (EC 3.2.1.73; lichenases). β-Glucanases in the context of the invention also include endo-1,3-β-D-glucosidases (EC 3.2.1.39; laminarinases). β-Glucanases cleave mixed glucans, which are linked alternately by 1,3- and 1,4-β-glucoside bonds, into oligosaccharides. Polymeric mixed glucans such as these are present in varying amounts in virtually all cereal products. Hitherto, enzymes capable of cleaving them have been used above all in the food, beverage and animal feed industry, in the textile industry and in the processing of starch (R. Borriss, "β-Glucan-spaltende Enzyme", in H. Ruttloff: "Industrielle Enzyme", Chapter 11.5, Behr's Verlag, Hamburg, 1994).

β-Glucanases suitable for use in accordance with the invention are obtainable from microorganisms, for example *Achromobacter lunatus, Athrobacter luteus, Aspergillus aculeatus, Aspergillus niger, Bacillus subtilis, Disporotrichum dimorphosporum, Humicola insolens, Penicillium emersonii, Penicillium funiculosum* or *Trichoderna reesei.* A commercial product is marketed, for example, under the name of Cereflo® (manufacturer: Novo Nordisk A/S). Preferred β-Glucanases include an enzyme obtainable from *Bacillus alkalophilus* (DSM 9956) which is the subject of German patent application DE 197 32 751.

β-Glucanase is preferably incorporated in compositions according to the invention in such quantities that they have glucanolytic activities of 0.05 U/g to 1 U/g and more particularly in the range from 0.06 U/g to 0.25 U/g. The determination of the glucanolytic activity is based on modifications of the process described by M. Lever in Anal. Biochem. 47 (1972), 273–279 and Anal Biochem. 81 (1977), 21–27. A 0.5% by weight solution of β-glucan (Sigma No. G6513) in 50 mM glycine buffer (pH 9.0) is used for this purpose. 250 μl of this solution are added to 250 μl of a solution containing the agent to be tested for glucanolytic activity and incubated for 30 minutes at 40° C. 1.5 ml of a 1% by weight solution of p-hydroxybenzoic acid hydrazide (PAHBAH) in 0.5 M NaOH, which contains 1 mM bismuth nitrate and 1 mM potassium sodium tartrate, are then added, after which the solution is heated for 10 minutes to 70° C. After cooling (2 minutes/0° C.), the absorption at 410 nm is determined against a blank value at room temperature (for example with a Uvikon® 930 photometer) using a glucose calibration curve. The blank value is a solution which is prepared in the same way as the measuring solution except that the glucan solution is added after the PAHBAH solution. 1 U corresponds to the quantity of enzyme which produces 1 μmole of glucose per minute under these conditions.

The present invention also relates to the use of β-glucanase for removing polysaccharide soils from textiles and to a process for removing polysaccharide soils from textiles by using β-glucanase. For the use according to the invention and for the process according to the invention, the β-glucanase may be applied to polysaccharide-soiled textiles either on its own or as part of a laundry pretreatment composition in the course of a pretreatment step preceding the washing process. However, the β-glucanase is preferably used as part of an aqueous cleaning solution which may additionally contain typical ingredients of wash liquors. Glucanolytic activities of 0.2 U/l to 4 U/l and, more particularly, 0.25 U/l to 1 U/l in the aqueous cleaning solution are preferred. In machine washing processes, for example in the routine washing of domestic laundry in washing machines, the glucanolytic activities mentioned do not have to be maintained over the entire washing cycle to achieve the required washing result providing it is guaranteed that a glucanolytic activity in the range mentioned prevails for at least a short time, for example for about 5 to 20 minutes.

β-Glucanase may be adsorbed onto supports and/or encapsulated in shell-forming substances to protect it against premature inactivation, particularly where it is used in particulate detergents as described, for example, in European patent EP 0 564 476 or in International patent applications WO 94/23005 for other enzymes.

In the course of the development work on which the present invention is based, it was surprisingly found that, if desired, amylase need not be used at all with no significant loss of cleaning performance against polysaccharide soils consisting at least partly of starch.

Since the washing performance of proteolytic and β-glucanolytic enzymes is unexpectedly increased when they are used in combination, a laundry detergent according to the invention preferably contains at least one protease in addition to β-glucanase. A detergent according to the invention is distinguished in particular by a proteolytic activity of about 100 PU/g to about 7500 PU/g and, more particularly, in the range from 500 PU/g to 5000 PU/g. The protease activity is determined by the standardized method described in the following (cf. Tenside 7 (1970), 125): a solution containing 12 g/l casein and 30 mM sodium tripolyphosphate in water with a hardness of 15°dH (containing 0.058% by weight $CaCl_2.2H_2O$, 0.028% by weight $MgCl_2.6H_2O$ and 0.042% by weight $NaHCO_3$) is heated to 70° C. and the pH is adjusted to 8.5 by addition of 0.1 N NaOH at 50° C. 200 ml of a solution of the agent to be tested for proteolytic activity in 2% by weight sodium tripolyphosphate buffer solution (pH 8.5) are added to 600 ml of the substrate solution. The reaction mixture is incubated for 15 minutes at 50° C. The reaction is then stopped by addition of 500 ml of TCA solution (0.44 M trichloroacetic acid and 0.22 M sodium acetate in 3% by volume acetic acid) and cooling (ice bath at 0° C., 15 minutes). The TCA-insoluble protein is removed by centrifuging and 900 ml of the supernatant are diluted with 300 ml 2 N NaOH. The absorption of this solution at 290 nm is determined with an absorption spectrometer, the zero absorption value having to be determined by measuring a centrifuged solution prepared by mixing 600 ml of the above-mentioned TCA solution with 600 ml of the above-mentioned substrate solution and then adding the enzyme solution. The proteolytic activity of a solution which produces an absorption of 0.500 OD under the described measuring conditions is defined as 10 PU (protease units) per ml. The proteases preferably used in compositions according to the invention include the enzymes known from International patent applications WO 91/02792, WO 92/21760 and WO 95/23221.

Besides the β-glucanase used in accordance with the invention, the detergents according to the invention—which may be present as, in particular, powder-form solids, as post-compacted particles or as homogeneous solutions or suspensions—may in principle contain any known ingredients typically encountered in detergents. More particularly, the detergents according to the invention may contain builders, surfactants, bleaching agents based on organic and/or inorganic peroxygen compounds, bleach activators, water-miscible organic solvents, additional enzymes, sequestering agents, electrolytes, pH regulators and/or other auxiliaries, such as optical brighteners, redeposition inhibitors, dye transfer inhibitors, foam regulators, dyes and perfumes.

The detergents according to the invention may contain one or more surfactants, more particularly anionic surfactants, nonionic surfactants and mixtures thereof. Suitable nonionic surfactants are, in particular, alkyl glycosides and ethoxylation and/or propoxylation products of alkyl glycosides or linear or branched alcohols containing 12 to 18 carbon atoms in the alkyl moiety and 3 to 20 and preferably 4 to 10 alkyl ether groups. Corresponding ethoxylation and/or propoxylation products of N-alkylamines, vicinal diols, fatty acid esters and fatty acid amides, which correspond to the long-chain alcohol derivatives mentioned in regard to the alkyl moiety, and of alkyl phenols containing 5 to 12 carbon atoms in the alkyl group are also suitable.

Suitable anionic surfactants are, in particular, soaps and those which contain sulfate or sulfonate groups with, preferably, alkali metal ions as cations. Suitable soaps are preferably the alkali metal salts of saturated or unsaturated fatty acids containing 12 to 18 carbon atoms. Fatty acids such as these may also be used in non-completely neutralized form. Suitable surfactants of the sulfate type include the salts of sulfuric acid semiesters of fatty alcohols containing 12 to 18 carbon atoms and sulfation products of the nonionic surfactants mentioned with a low degree of ethoxylation. Suitable surfactants of the sulfonate type include linear alkyl benzenesulfonates containing 9 to 14 carbon atoms in the alkyl moiety, alkanesulfonates containing 12 to 18 carbon atoms and olefin sulfonates containing 12 to 18 carbon atoms, which are formed in the reaction of corresponding monoolefins with sulfur trioxide, and α-sulfofatty acid esters which are formed in the sulfonation of fatty acid methyl or ethyl esters.

Surfactants such as these are present in the detergents according to the invention in quantities of, preferably, 5% by weight to 50% by weight and, more preferably, 8% by weight to 30% by weight.

A detergent according to the invention preferably contains at least one water-soluble and/or water-insoluble organic and/or inorganic builder. The water-soluble organic builders include polycarboxylic acids, more particularly citric acid and sugar acids, monomeric and polymeric aminopolycarboxylic acids, more particularly methyl glycine diacetic acid, nitrilotriacetic acid and ethylenediamine tetraacetic acid, and polyaspartic acid, polyphosphonic acids, more particularly aminotris-(methylenephosphonic acid), ethylenediamine-tetrakis-(methylenephosphonic acid) and 1-hydroxyethane-1,1-diphosphonic acid, polymeric hydroxy compounds, such as dextrin, and polymeric (poly)carboxylic acids, more particularly the polycarboxylates obtainable by oxidation of polysaccharides or dextrins according to International patent application WO 93/16110 or International patent application WO 92/18542 or European patent EP 0 232 202, polymeric acrylic acids, methacrylic acids, maleic acids and copolymers thereof which may also contain small amounts of polymerizable substances with no carboxylic acid functionality in copolymerized form. The relative molecular weight of the homopolymers of unsaturated carboxylic acids is generally between 5,000 and 200,000 and that of the copolymers between 2,000 and 200,000 and preferably between 50,000 and 120,000, based on free acid. A particularly preferred acrylic acid/maleic acid copolymer has a relative molecular weight of 50,000 to 100,000. Suitable but less preferred compounds of this class are copolymers of acrylic acid or methacrylic acid with vinyl ethers, such as vinyl methyl ethers, vinyl esters, ethylene, propylene and styrene, in which the acid makes up at least 50% by weight. Other suitable water-soluble organic builders are terpolymers which contain two unsaturated acids and/or salts thereof as monomers and vinyl alcohol and/or an esterified vinyl alcohol or a carbohydrate as the third monomer. The first acidic monomer or its salt is derived from a monoethylenically unsaturated $C_{3-8}$ carboxylic acid and preferably from a $C_{3-4}$ monocarboxylic acid, more particularly from (meth)acrylic acid. The second acidic monomer or its salt may be a derivative of a $C_{4-8}$ dicarboxylic acid, maleic acid being particularly preferred, and/or a derivative of an allylsulfonic acid substituted in the 2-position by an alkyl or aryl group. Polymers such as these may be produced by the processes described in German patent DE 42 21 381 and German patent application DE 43 00 772 and generally have a relative molecular weight of 1,000 to 200,000. Other preferred copolymers are those which are described in German patent applications DE 43 03 320 and DE 44 17 734 and which preferably contain acrolein and acrylic acid/acrylic acid salts or vinyl acetate as monomers. The organic builders may be used in the form of aqueous solutions, preferably in the form of 30 to 50% by weight aqueous solutions, especially for the production of liquid detergents. All the acids mentioned are generally used in the form of their water-soluble salts, more particularly their alkali metal salts.

If desired, organic builders of the type in question may be present in quantities of up to 40% by weight, preferably in quantities of up to 25% by weight and more preferably in quantities of 1% by weight to 8% by weight. Quantities near the upper limit mentioned are preferably used in paste-form or liquid—more particularly water-containing—detergents according to the invention.

Suitable water-soluble inorganic builders are, in particular, alkali metal silicates and polymeric alkali metal phosphates which may be present in the form of their alkaline, neutral or acidic sodium or potassium salts, Examples include tetrasodium diphosphate, disodium dihydrogen diphosphate, pentasodium triphosphate, so-called sodium hexametaphosphate, and the corresponding potassium salts or mixtures of sodium and potassium salts. Suitable water-insoluble, water-dispersible inorganic builders are, in particular, crystalline or amorphous alkali metal alumosilicates which are used in quantities of up to 50% by weight, preferably in quantities of not more than 40% by weight and—in liquid detergents—more particularly in quantities of 1% by weight to 5% by weight. Of these, crystalline sodium alumosilicates in detergent quality, more particularly zeolite A, P and optionally X, are preferred. Quantities near the upper limit mentioned are preferably used in solid particulate detergents. Suitable alumosilicates above all contain no particles larger than 30 $\mu$m in size, at least 80% by weight consisting of particles below 10 $\mu$m in size. The calcium binding capacity, which may be measured in accordance with German patent DE 24 12 837, is generally in the range from 100 to 200 mg CaO per gram.

Suitable substitutes or partial substitutes for the alumosilicate mentioned are crystalline alkali metal silicates which may be present on their own or in admixture with amorphous silicates. The alkali metal silicates suitable as builders in the detergents according to the invention preferably have a molar ratio of alkali metal oxide to $SiO_2$ below 1:0.95 and, more particularly, between 1:1.1 and 1:12 and may be present in amorphous or crystalline form. Preferred alkali metal silicates are the sodium silicates, more particularly the amorphous sodium silicates, with a molar $Na_2O:SiO_2$ ratio of 1:2 to 1:2.8. Those with a molar $Na_2O:SiO_2$ ratio of 1:1.9 to 1:2.8 may be produced by the process according to European patent application EP 0 425 427. Preferred crystalline silicates, which may be present on their own or in the form of a mixture with amorphous silicates, are crystalline layer silicates with the general formula $Na_2Si_xO_{2x+1}.yH_2O$ where x—the so-called modulus—is a number of 1.9 to 4 and y is a number of 0 to 20, preferred values for x being 2, 3 or 4. Crystalline layer silicates which fall within this general formula are described, for example, in European patent application EP 0 164 514. Preferred crystalline layer silicates are those in which x in the general formula shown above assumes the value 2 or 3. More particularly, both β- and δ-sodium disilicates ($Na_2Si_2O_5.yH_2O$) are preferred, β-sodium disilicate being obtainable, for example, by the process described in International patent application WO 91/08171. δ-Sodium silicates with a modulus of 1.9 to 3.2 may be produced in accordance with Japanese patent applications JP 04/238 809 and JP 04/260 610. Substantially water-free crystalline alkali metal silicates with the above general formula, where x is a number of 1.9 to 2.1, produced from amorphous alkali metal silicates as described in European patent applications EP 0 548 599, EP 0 502 325 and EP 0 452 428 may also be used in detergents according to the invention. Another preferred embodiment of detergents according to the invention is characterized by the use of a crystalline sodium layer silicate with a modulus of 2 to 3 which may be produced from sand and soda by the process according to European patent application EP 0 436 835. Crystalline sodium silicates with a modulus of 1.9 to 3.5 obtainable by the processes according to European patents EP 0 164 552 and/or EP 0 293 753 are used in another preferred embodiment of detergents according to the invention. Another preferred embodiment of detergents according to the invention is characterized by the use of the granular compound of alkali metal silicate and alkali metal carbonate which is described, for example, in International patent application WO 95/22592 or which is commercially obtainable, for example, as Nabion® 15. If alkali metal alumosilicate, especially zeolite, is also present as an additional builder, the ratio by weight of alumosilicate to silicate, expressed as water-free active substances, is preferably from 1:10 to 10:1. In detergents containing both amorphous and crystalline alkali metal silicates, the ratio by weight of amorphous alkali metal silicate to crystalline alkali metal silicate is preferably 1:1 to 2:1 and, more particularly, 1:1 to 2:1.

Builders are present in the detergents according to the invention in quantities of preferably up to 60% by weight and, more preferably, 5% by weight to 40% by weight.

Suitable peroxygen compounds are, in particular, organic peracids or peracidic salts of organic acids, such as phthalimidopercaproic acid, perbenzoic acid or salts of diperdodecane diacid, hydrogen peroxide and inorganic salts which release hydrogen peroxide under the washing conditions, such as perborate, percarbonate and/or persilicate. Hydrogen peroxide can also be produced by an enzyme system, i.e. an oxidase and its substrate. If solid peroxygen compounds are to be used, they may be used in the form of powders or granules which may also be coated in known manner. In a particularly preferred embodiment, alkali metal percarbonate, alkali metal perborate monohydrate, alkali metal perborate tetrahydrate or hydrogen peroxide is used in the form of an aqueous solution containing 3% by weight to 10% by weight of hydrogen peroxide. If a detergent according to the invention contains peroxygen compounds, the peroxygen compounds are present in quantities of preferably up to 50% by weight and, more preferably, 5% by weight to 30% by weight. The addition of small quantities of known bleach stabilizers, for example phosphonates, borates or metaborates and metasilicates and magnesium salts, such as magnesium sulfate, can be useful.

The bleach activators may be compounds which form aliphatic peroxocarboxylic acids containing preferably 1 to 10 carbon atoms and more preferably 2 to 4 carbon atoms and/or optionally substituted perbenzoic acid under perhydrolysis conditions. Substances bearing O- and/or N-acyl groups with the number of carbon atoms mentioned and/or optionally substituted benzoyl groups are suitable. Preferred bleach activators are polyacylated alkylenediamines, more particularly tetraacetyl ethylenediamine (TAED), acylated triazine derivatives, more particularly 1,5-diacetyl-2,4-dioxohexahydro-1,3,5-triazine (DADHT), acylated glycolurils, more particularly tetraacetyl glycoluril (TAGU), N-acylimides, more particularly N-nonanoyl succinimide (NOSI), acylated phenol sulfonates, more particularly n-nonanoyl or isononanoyloxybenzenesulfonate (n- or iso-NOBS), carboxylic anhydrides, more particularly phthalic anhydride, acylated polyhydric alcohols, more particularly triacetin, ethylene glycol diacetate, 2,5-diacetoxy-2,5-dihydrofuran and the enol esters known from German patent applications DE 196 16 693 and DE 196 16 767, acetylated sorbitol and mannitol and the mixtures thereof (SORMAN) described in European patent application EP 0 525 239, acylated sugar derivatives, more particularly pentaacetyl glucose (PAG), pentaacetyl fructose, tetraacetyl xylose and octaacetyl lactose, and acetylated, optionally N-alkylated glucamine and gluconolactone, and/or N-acylated lactams, for example N-benzoyl caprolactam, which are known from International patent applications WO-A-94/27970, WO-A-94/28102, WO-A-94/28103, WO-A-95/00626, WO-A-95/14759 and WO-A-95/17498. The substituted hydrophilic acyl acetals known from German patent application DE 196 16 769 and the acyl lactams described in German patent application DE 196 16 770 and in International patent application WO 95/14075 are also preferably used. The combinations of conventional bleach activators known from German patent application DE 44 43 177 may also be used. Bleach activators such as these are present in the usual quantities, preferably in quantities of 1% by weight to 10% by weight and more preferably in quantities of 2% by weight to 8% by weight, based on the detergent as a whole.

In addition to or instead of the conventional bleach activators mentioned above, the sulfonimines known from European patents EP 0 446 982 and EP 0 453 003 and/or bleach-boosting transition metal salts or transition metal complexes may also be present as so-called bleach catalysts. Suitable transition metal compounds include, in particular, the manganese-, iron-, cobalt-, ruthenium- or molybdenum-salen complexes known from German patent application DE 195 29 905 and the N-analog compounds thereof known from German patent application DE 196 20 267, the manganese-, iron-, cobalt-, ruthenium- or molybdenum-carbonyl complexes known from German patent application DE 195 36 082, the manganese, iron, cobalt, ruthenium, molybdenum, titanium, vanadium and copper complexes with nitrogen-containing tripod ligands described in German patent application DE 196 05 688, the cobalt-, iron-, copper- and ruthenium-ammine complexes known from German patent application DE 196 20 411, the manganese, copper and cobalt complexes described in German patent application DE 44 16 438, the cobalt complexes described in European patent application EP 0 272 030, the manganese complexes known from European patent application EP 0 693 550, the manganese, iron, cobalt and copper complexes known from European patent EP 0 392 592, the cobalt complexes known from International patent applications WO 96/23859, WO 96/23860 and 96/23861 and/or the manganese complexes described in European patent EP 0 443 651 or in European patent applications EP 0 458 397, EP 0 458 398, EP 0 549 271, EP 0 549 272, EP 0 544 490 and EP 0 544 519. Combinations of bleach activators and transition metal bleach catalysts are known, for example, from German patent application DE 196 13 103 and from international patent application WO 95/27775. Bleach-boosting transition metal complexes, more particularly with the central atoms Mn, Fe, Co. Cu, Mo. V, Ti and/or Ru, are used in typical quantities, preferably in a quantity of up to 1% by weight, more preferably in a quantity of 0.0025% by weight to 0.25% by weight and most preferably in a quantity of 0.01% by weight to 0.1% by weight, based on the detergent as a whole.

Enzymes suitable for use in the detergents besides the β-glucanase crucial to the invention and the oxidase mentioned above are those from the class of proteases, lipases, cutinases, amylases, pullulanases, cellulases, hemicellulases, xylanases and peroxidases and mixtures thereof, for example proteases, such as subtilisin BPN', Properase®, BLAP®, Optimase®, Opticlean®, Maxatase®, Maxacal®, Maxapem®, Alcalase®, Esperase®, Savinase®, Durazym®, Everlase® and/or Purafect® G or OxP; amylases, such as BAN®, Termamyl®, Amylase-LT®, Maxamyl®, Duramyl® and/or Purafect®OxAm; lipases, such as Lipolase®, Lipomax®, Lumafast® and/or Lipozym®; cellulases, such as KAC®, Celluzyme®, Carezyme®, and/or the enzymes known from International patent applications WO 96/34108 and WO 97/13862. Enzymes obtained from fungi or bacteria, such as *Bacillus subtilis, Bacillus licheniformis, Streptomyces griseus, Humicola lanuginosa, Humicola insolens, Pseudomonas peudoalcaligenes* or *Pseudomonas cepacia* are particularly suitable. The additional enzymes optionally used may also be adsorbed to supports and/or embedded in shell-forming materials for protection against premature inactivation, for example as described in European patent 0 564 476 or in International patent application WO 94/23005. They are present in the detergents according to the invention in quantities of preferably up to 10% by weight and, more preferably, from 0.2% by weight to 2% by weight, enzymes stabilized against oxidative degradation, as known for example from International patent applications WO 94/02597, WO 94/02618, WO 94/18314, WO 94/23053 or WO 95107350, being particularly preferred. In one particularly preferred embodiment of the invention, the detergent may be amylase-free or contains at least minimal amounts of amylase because the use of β-glucanase generally enables even amylolytically removable soils on textiles to be removed without any significant loss of performance The organic solvents suitable for use in the detergents according to the invention, particularly where they are present in liquid or paste-like form, include $C_{1-4}$ alcohols, more especially methanol, ethanol, isopropanol and tert. butanol, $C_{2-4}$ diols, more especially ethylene glycol and propylene glycol, and mixtures thereof and ethers derived from the classes of compound mentioned. Water-miscible solvents such as these are present in the detergents according to the invention in quantities of preferably not more than 30% by weight and, more preferably, between 6% by weight and 20% by weight.

To establish a desired pH value which is not spontaneously adjusted by the mixture of the other components, the detergents according to the invention may contain system-compatible and environmentally compatible acids, more particularly citric acid, acetic acid, tartaric acid, malic acid, lactic acid, glycolic acid, succinic acid, glutaric acid and/or adipic acid and also mineral acids, more especially sulfuric acid, or bases, more especially ammonium or alkali metal hydroxides. pH regulators such as these are present in the detergents according to the invention in quantities of preferably not more than 20% by weight and, more preferably, between 1.2% by weight and 17% by weight.

The dye transfer inhibitors suitable for use in detergents according to the invention, more particularly laundry detergents, include in particular polyvinyl pyrrolidones, polyvinyl imidazoles, polymer N-oxides, such as poly-(vinlylpyridine-N-oxide) and vinyl pyrrolidone/vinyl imidazole copolymers.

The function of redeposition inhibitors is to keep the soil detached from the hard surfaces and particularly from the textile fibers suspended in the wash liquor. Suitable redeposition inhibitors are water-soluble, generally organic colloids, for example starch, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Other starch derivatives than those mentioned above, for example aldehyde starches, may also be used. Cellulose ethers, such as carboxymethyl cellulose (sodium salt), methyl cellulose, hydroxyalkyl cellulose, and mixed ethers, such as methyl hydroxyethyl cellulose, methyl hydroxypropyl cellulose, methyl carboxymethyl cellulose and mixtures thereof, are preferably used, for example in quantities of 0.1 to 5% by weight, based on the detergent.

The detergents may contain derivatives of diaminostilbene disulfonic acid or alkali metal salts thereof as optical brighteners. Suitable optical brighteners are, for example, salts of 4,4'-bis-(2-anilino-4-morpholino-1,3,5-triazinyl-6-amino)-stilbene-2,2'-disulfonic acid or compounds of similar structure which contain a diethanolamino group, a methylamino group and anilino group or a 2-methoxyethylamino group instead of the morpholino group. Brighteners of the substituted diphenyl styryl type, for example alkali metal salts of 4,4'-bis-(2-sulfostyryl)-diphenyl, 4,4'-bis-(4-chloro-3-sulfostyryl)-diphenyl or 4-(4-chlorostyryl)-4'-(2-sulfostyryl)-diphenyl, may also be present. Mixtures of the brighteners mentioned may also be used.

Particularly where the detergents are used in washing machines, it can be of advantage to add typical foam inhibitors to them. Suitable foam inhibitors are, for example, soaps of natural or synthetic origin which have a high percentage content of $C_{18-24}$ fatty acids. Suitable non-surface-active foam inhibitors are, for example, organopolysiloxanes and mixtures thereof with microfine, optionally silanized, silica and also paraffins, waxes, microcrystalline waxes and mixtures thereof with silanized silica or bis-stearyl ethylenediamide. Mixtures of different foam inhibitors, for example mixtures of silicones, paraffins and waxes, may also be used with advantage. The foam inhibitors, more particularly silicone- and/or paraffin-containing foam inhibitors, are preferably fixed to a granular water-soluble or water-dispersible support. Mixtures of paraffins and bis-stearyl ethylenediamides are particularly preferred.

The production of solid detergents according to the invention does not involve any difficulties and may be carried out in known manner, for example by spray drying or granulation, the β-glucanase and other enzymes, if any, and any other heat-sensitive ingredients, for example bleaching agents, optionally being separately added at a later stage. Detergents according to the invention having a high bulk density, more particularly in the range from 650 g/l to 950 g/l, are preferably produced by the process comprising an extrusion step which is known from European patent EP 486 592. Another preferred method of production is granulation as described in European patent EP 0 642 576. Liquid or paste-form detergents according to the invention in the form of solutions containing typical solvents are generally produced simply by mixing the ingredients which may be introduced into an automatic mixer either as such or in the form of a solution.

EXAMPLES

To determine washing performance, cotton fabrics soiled with standardized test soils were washed at 30° C. (detergent dose 80 g; water hardness 16°d; load 3.5 kg, short program) in a domestic washing machine (Miele W 914 Novotronic®. The washing results (as the outcome of double determinations) are shown in Table I below (in dE initial value minus dE after washing, as measured with a Minolta® CR 310) for an enzyme-free detergent V1, for a detergent V2 with otherwise the same composition, but additionally containing 0.5% by weight of amylase granules (Termamyl® 60T), for a detergent V3 which had the same composition as V2, but additionally contained 0.5% by weight of protease granules (activity 200,000 PU/g), for a detergent M1 according to the invention which had the same composition as V1, but additionally contained 0.125 U/g Cereflo®, for a detergent M2 which had the same composition as M1, but which instead of Cereflo® contained β-glucanase from *Bacillus alkalophilus* (DSM 9956) in a quantity producing the same activity, for a detergent M3 which had the same composition as V3 but, instead of Termamyl®, contained 0.125 U/g of Cereflo® and for a detergent M4 which had the same composition as M3 but, instead of Cereflo®, contained β-glucanase from *Bacillus alkalophilus* (DSM 9956) in a quantity producing the same activity.

TABLE

Washing results (dE AW - dE)

| Detergent | Washing result for soil A | B | C |
|---|---|---|---|
| M1 | 45.1 | 32.0 | 42.5 |
| M2 | 35.4 | n.d. | n.d. |
| M3 | 48.3 | 33.4 | 50.5 |
| M4 | 41.6 | 29.7 | 49.2 |
| V1 | 31.8 | 26.7 | 41.1 |
| V2 | 35.2 | 28.9 | 41.9 |
| V3 | 35.7 | 30.3 | 49.7 |

Soil
A: Oat flakes/cocoa
B: Chocolate pudding
C: Milk/cocoa
n.d.: Not determined It can be seen that detergents according to the invention are significantly superior in their cleaning performance to the comparison detergents of directly comparable composition.

What is claimed is:

1. A detergent composition comprising a β-glucanase obtained from *Bacillus alkalophilus* (DSM 9956) wherein said composition has a glucanolytic activity of from 0.05 U/g to 1 U/g.

2. The detergent composition of claim 1 having a glucanolytic activity of from 0.06 to 0.25 U/g.

3. The detergent composition of claim 1 further comprising at least one protease.

4. The detergent composition of claim 3 having a proteolytic activity of from 100 PU/g to 7500 PU/g.

5. The detergent composition of claim 4 having a proteolytic activity of from 500 PU/g to 5000 PU/g.

6. The detergent composition of claim 1 wherein said detergent is free from amylase.

7. The detergent composition of claim 1 wherein said β-glucanase is absorbed onto supports or encapsulated in shell-forming substances.

8. A process for removing polysaccharide soils on a textile comprising contacting said soils with a β-glucanase obtained from *Bacillus alkalophilus* (DSM 9956) and having a glucanolytic activity of from 0.05 U/g to 1 U/g.

9. The process of claim 8 wherein an aqueous washing solution comprises said β-glucanase.

10. The process of claim 9 wherein said aqueous washing solution has a glucanolytic activity of from 0.2 U/l to 4 U/l.

11. The process of claim 10 wherein said aqueous washing solution has a glucanolytic activity of from 0.25 U/l to 1 U/l.

* * * * *